United States Patent
Usui

(10) Patent No.: US 9,223,680 B2
(45) Date of Patent: Dec. 29, 2015

(54) INFORMATION PROCESSING APPARATUS AND DEBUGGING METHOD

(71) Applicant: KABUSHIKI KAISHA TOSHIBA, Tokyo (JP)

(72) Inventor: Hiroyuki Usui, Pittsburgh, PA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/195,016

(22) Filed: Mar. 3, 2014

(65) Prior Publication Data

US 2014/0289711 A1    Sep. 25, 2014

(30) Foreign Application Priority Data

Mar. 19, 2013   (JP) .................................. 2013-056313

(51) Int. Cl.
| | | |
|---|---|---|
| *G06F 9/44* | (2006.01) | |
| *G06F 11/36* | (2006.01) | |
| *G06F 12/08* | (2006.01) | |
| *G06F 11/22* | (2006.01) | |

(52) U.S. Cl.
CPC .......... *G06F 11/362* (2013.01); *G06F 11/2236* (2013.01); *G06F 11/3688* (2013.01); *G06F 12/084* (2013.01); *G06F 12/0864* (2013.01); *G06F 2212/6032* (2013.04)

(58) Field of Classification Search
CPC   G06F 11/236; G06F 11/2236; G06F 11/3688
USPC ................................... 717/129, 124; 714/130
See application file for complete search history.

(56) References Cited

U.S. PATENT DOCUMENTS

| 4,633,292 | A | | 12/1986 | Fellinger et al. |
| 4,954,868 | A | | 9/1990 | Bergmann et al. |
| 5,311,052 | A | | 5/1994 | Stengl et al. |
| 5,533,192 | A | * | 7/1996 | Hawley et al. .................. 714/28 |
| 6,064,103 | A | | 5/2000 | Pfirsch |

(Continued)

FOREIGN PATENT DOCUMENTS

| JP | H08-305607 A | 11/1996 |
| JP | 2004-103024 A | 4/2004 |

(Continued)

OTHER PUBLICATIONS

Zhong et al., "Improve the GNU Debugger for the Design of Multi-Core Wireless Nodes", 2010.*

(Continued)

*Primary Examiner* — Phillip H Nguyen
(74) *Attorney, Agent, or Firm* — Patterson & Sheridan, LLP

(57) ABSTRACT

An information processing apparatus includes a system memory, a cache system that includes a cache memory, and a plurality of cores, each of which accesses the system memory and the cache memory. The cache system stores in a cache line of the cache memory a break indicator that designates one or more of the plurality of cores. The cache system determine whether a first core in the plurality of cores that issues a request to read data from an address that corresponds to the cache line in which the break indicator is stored matches one of the cores designated by the break indicator. If the first core matches one of the cores designated by the break indicator, the cache system returns a break command to the first core. If the first core does not match one of the cores designated by the break indicator, the cache system returns the data to the first core.

18 Claims, 12 Drawing Sheets

(56) References Cited

U.S. PATENT DOCUMENTS

| | | | |
|---|---|---|---|
| 7,131,114 B2 * | 10/2006 | Nguyen et al. | 717/129 |
| 7,233,031 B2 | 6/2007 | Mauder et al. | |
| 7,296,259 B2 | 11/2007 | Betker et al. | |
| 7,665,002 B1 * | 2/2010 | White et al. | 714/733 |
| 7,689,867 B2 * | 3/2010 | Rosenbluth et al. | 714/34 |
| 2003/0014736 A1 * | 1/2003 | Nguyen et al. | 717/129 |
| 2006/0282707 A1 * | 12/2006 | Rosenbluth et al. | 714/38 |
| 2007/0226740 A1 * | 9/2007 | Li et al. | 718/102 |
| 2008/0010493 A1 * | 1/2008 | Watanabe et al. | 714/4 |
| 2010/0257319 A1 | 10/2010 | Usui | |
| 2011/0072309 A1 * | 3/2011 | Sakai et al. | 714/35 |
| 2012/0012929 A1 | 1/2012 | Saito et al. | |
| 2013/0326203 A1 * | 12/2013 | Usui | 712/227 |
| 2014/0077261 A1 | 3/2014 | Oshino et al. | |

FOREIGN PATENT DOCUMENTS

| | | |
|---|---|---|
| JP | 2007122547 A | 5/2007 |
| JP | 2009-253126 A | 10/2009 |
| JP | 2012-018972 A | 1/2012 |

OTHER PUBLICATIONS

Japanese Office Action dated Jun. 16, 2015, filed in Japanese counterpart Application No. 2013-056313, 5 pages (with translation).

* cited by examiner

INFORMATION PROCESSING APPARATUS AND DEBUGGING METHOD

CROSS-REFERENCE TO RELATED APPLICATION

This application is based upon and claims the benefit of priority from Japanese Patent Application No. 2013-056313, filed Mar. 19, 2013, the entire contents of which are incorporated herein by reference.

FIELD

Embodiments described herein relate to an information processing apparatus and a debugging method.

BACKGROUND

In a debugging operation performed while developing software, it is often the case where a function of stopping the execution of the program is used at a point of time the operation arrives at a designated location of a program. This designated portion is called a breakpoint. The breakpoint may be classified as a breakpoint implemented by hardware (hardware breakpoint) or a breakpoint implemented by software (software breakpoint).

When hardware breakpoints are used, breakpoints may be set individually for each processor core. Setting a breakpoint for one core is advantageous in parallelized applications because doing so does not disrupt the execution of other cores that execute in parallel with the core for which the breakpoint is set. However, the number of hardware breakpoints which may be set is limited.

On the other hand, software breakpoints may be implemented by replacing a command at a designated location with a particular command which stops the execution of the program. However, when a software breakpoint is used, a command in memory is rewritten. Accordingly, when an information processing apparatus on which software is executed has a plurality of processor cores, and these cores use a common shared memory, the execution of software is stopped in each core that executes the corresponding command. That is, in the past, when using a software breakpoint, it has not been possible to set a software breakpoint for one core out of a plurality of cores.

Examples of related art include JP-A-2004-103024 and JP-A-8-305607.

DETAILED DESCRIPTION

Embodiments provide an information processing apparatus and a debugging method to set a target of a software breakpoint for each core.

According to one embodiment, the information processing apparatus comprises a system memory, a cache system including a cache memory, and a plurality of cores, each of which accesses the system memory and the cache memory. The cache system stores in a cache line of the cache memory a break indicator that designates one or more of the plurality of cores. The cache system is configured to determine whether a first core in the plurality of cores that issues a request to read data from an address that corresponds to the cache line in which the break indicator is stored matches one of the cores designated by the break indicator. The cache system is further configured to, responsive to the determining, return a break command to the first core if the first core matches one of the cores designated by the break indicator. The cache system is further configured to return the data to the first core if the first core does not match one of the cores designated by the break indicator.

Hereinafter, an information processing apparatus and a method of debugging according to embodiments are explained in detail in conjunction with attached drawings. The present invention is not limited to these embodiments.

First Embodiment

Figure 1:
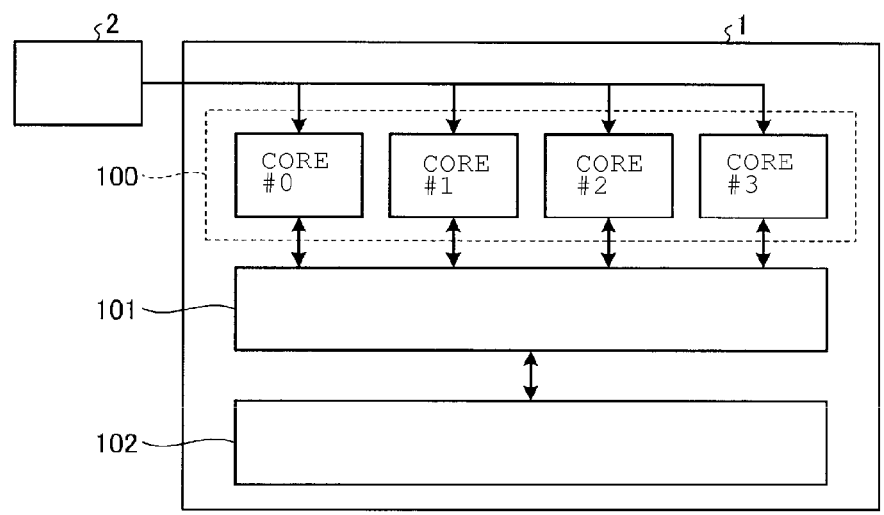
FIG. 1 is a block diagram showing an information processing apparatus according to a first embodiment.

FIG. 1 is a block diagram showing the constitution of an information processing apparatus of the first embodiment. The information processing apparatus 1 includes: a multi-core processor 100; a shared cache (cache system) 101; and a system memory 102. The information processing apparatus 1 may correspond to a built-in computer mounted on an imaging device, a mobile phone, or the like. The information processing apparatus 1 may be formed on one chip or a plurality of chips.

The multi-core processor 100 includes a plurality of cores. The multi-core processor 100 shown in FIG. 1 includes four cores #0 to #3. The shared cache 101 is connected to the memory 102. The cores #0 to core #3 are connected to the shared cache 101 respectively, and use a memory space in common.

A debugger 2 is connected to the cores #0 to #3 from outside the information processing apparatus 1. The debugger 2 may access the shared cache 101 and the memory 102 through the cores #0 to #3. In an embodiment, debugger 2 is connected to an interface device that connects the debugger 2 to the information processing apparatus 1. Debugger 2 may be implemented as a personal computer that executes a debugging program and that uses the interface device, for example, wherein the interface device and the personal computer are cooperatively operated.

Figure 2:
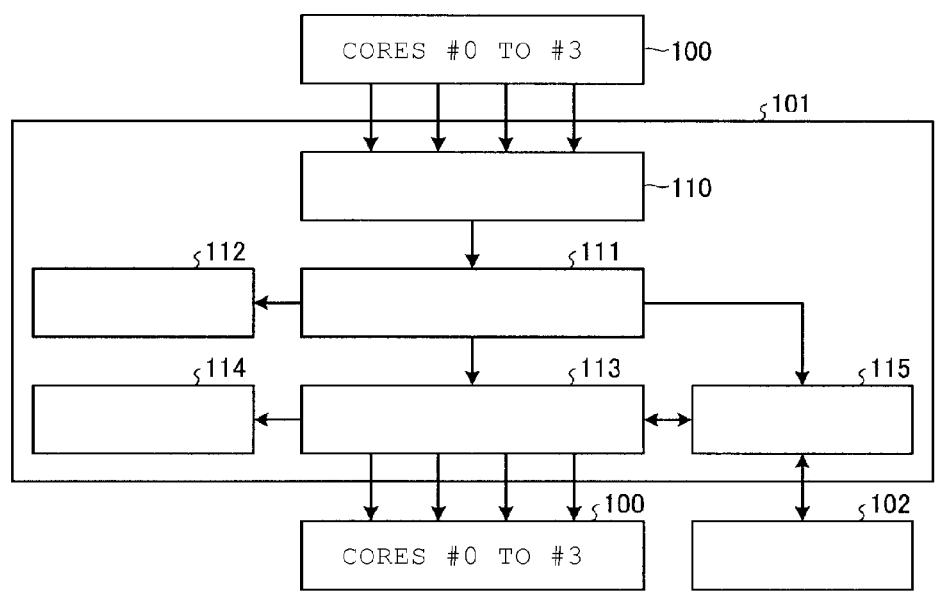
FIG. 2 is a block diagram showing the internal structure of a shared cache.

FIG. 2 is a block diagram showing the internal constitution of the shared cache 101. The shared cache 101 includes: an arbiter 11; a tag read and comparison part 111; a cache tag memory 112; a data access part 113; a cache data memory 114; and a refill and write back part 115. Access requests from the cores #0 to #3 are input to the arbiter 110. The arbiter selects one access request out of the access requests input to the arbiter, and inputs an address that the selected access request contains (i.e., an address to be accessed) to the tag read and comparison part 111. The tag read and comparison part 111 references the cache tag memory 112, and determines whether a cache miss or a cache hit is detected based on the result of the reference to the cache tag memory using the requested address. When the access request results in a cache hit, the tag read and comparison part 111 accesses the cache data memory 114 through the data access part 113. When the access request results in a cache miss, the refill and write back part accesses the memory 102. In the first embodiment, the cache memory 114 has a plurality of cache ways controlled by the shared cache 101.

In this embodiment, a case where the cores #0 to #3 output an access request that is a read request is explained.

Figure 3:
FIG. 3 is a diagram showing a format of a cache tag memory.

FIG. 3 is a diagram showing the format of the cache tag memory 112, according to an exemplary embodiment. Tag data (Tag), a flag (Dirty:D) which indicates whether or not a cache line has been already rewritten, a Valid flag (Valid:V), which indicates whether or not a cache line is valid, and a Debug flag (Debug:Db), which indicates whether or not a software breakpoint is set, are recorded in the cache tag memory 112 for each cache line. When a Write-Through system cache is used, the cache tag memory 112 does not include the D flag.

Figure 4:
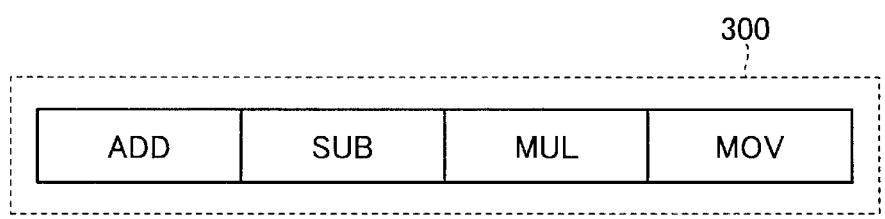
FIG. 4 is a diagram depicting a command string that may be stored in a cache data memory.
Figure 5:
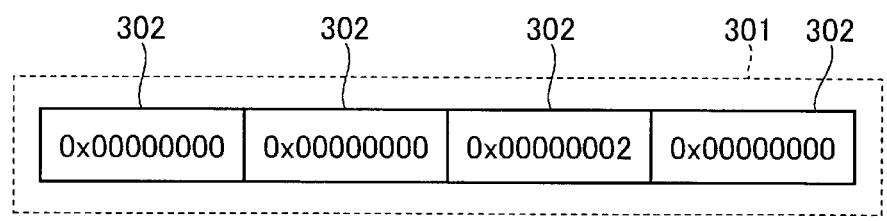
FIG. 5 is a diagram depicting a break indicator string that may be stored in a cache data memory.
Figure 6:
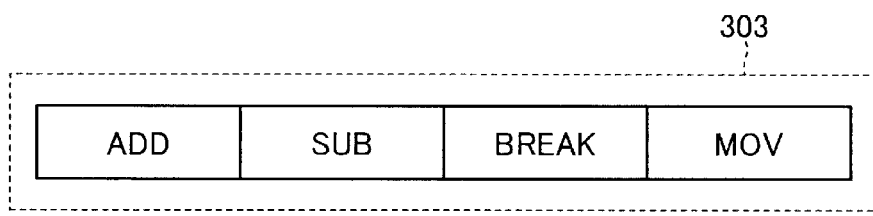
FIG. 6 is a diagram depicting a modified command string.

FIG. 4 to FIG. 6 are diagrams for explaining the format of the cache data memory 114 of the exemplary embodiment. In this embodiment, assume that a command string comprising four commands (unit data) is stored in the cache data memory 114 for each cache line. The cache data memory 114 has a line width of 128 bits, has four cache ways, and has a size of 4 MB. Each command has a size of 32 bits, and one command string has a size of 128 bits. FIG. 4 shows an example of a normal command string which is stored in the cache data memory 114. A command string 300 shown in FIG. 4 includes four commands including a MOV (data movement) command, a MUL (multiplication) command, a SUB (subtraction) command, and an ADD (addition) command, in this order.

A break indicator may be stored in a cache line of the cache data memory 114 in the shared cache 101 by the debugger 2. The break indicator designates a core that is a target of a breakpoint. A Db flag may be set in the cache tag memory 112 in the shared cache 101 by the debugger 2. In setting a breakpoint, a programmer stores a break indicator in a cache line corresponding to an address where a command string 300, which is a target of a breakpoint, is stored, and sets "1" to a Db flag of the tag data corresponding to the cache line in which the break indicator is stored.

FIG. 5 is a diagram showing an example of a break indicator. The break indicator string 301 includes four break indicators 302, each of which has a size of 32 bits. The break indicators 302 correspond to commands which the command string 300 contains, respectively corresponding to the order of an array. That is, the break indicator 302 designates a target command of a breakpoint out of a plurality of commands stored in one cache line based on the position where the break indicator 302 is stored in break indicator string 301.

The break indicator 302 designates the core which is the target of a breakpoint. In this embodiment, the break indicator 302 indicates the number given to the core which is the target of a breakpoint using a bit number counted from an LSB (least significant bit). That is, when the core #0 is the target, the break indicator 302 has the value "1" in the LSB, and when the core #n is the target, the break indicator 302 has the value "1" in an n-th bit from the LSB. When none of the cores is the target, all break indicators 302 have a value of "0". FIG. 5 shows a situation where the core #1 of the break indicator 302 is set as the target of a breakpoint with respect to the third command counted from the head of the break indicator string 301.

When the break indicator string 301 is stored in a cache line corresponding to an address to which a read request is made by the core that is the target of a breakpoint, the shared cache 101 generates a command string which includes a BREAK command (a command for generating the debug interruption) based on a break indicator string 301 and a command string 300 that is the target of a read request. FIG. 6 is a diagram showing a command string that includes a BREAK command. In the command string 303 shown in FIG. 6, the BREAK command is stored in the third field, and commands appearing in the command string 300 shown in FIG. 4 are stored in other fields. Hereinafter, the normal command string which does not include a BREAK command is referred to as the first command string 300, and the command string which includes the BREAK command is referred to as the second command string 303.

Figure 7:
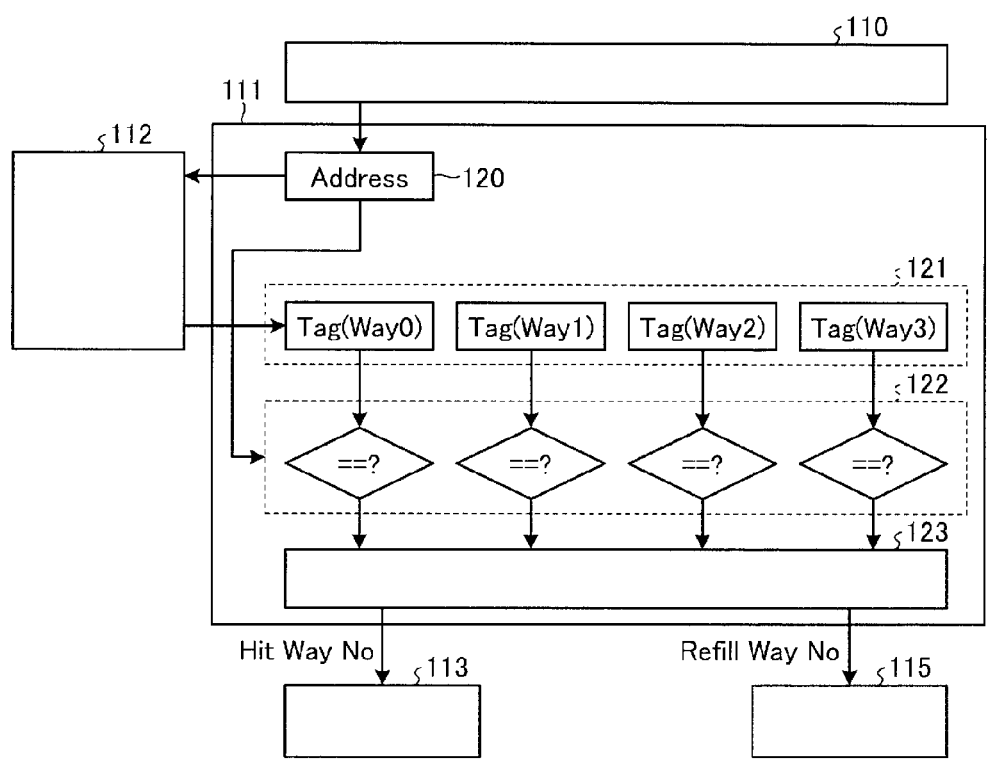
FIG. 7 is a block diagram showing the internal structure of a tag read and comparison part according to the first embodiment.

FIG. 7 is a diagram showing the internal constitution of the tag read and comparison part 111 of the first embodiment. The tag read and comparison part 111 includes: a buffer 120; a buffer 121; a comparison part 122; and a check and selection part 123. The buffer 120 stores addresses from the arbiter 110 therein. The buffer 121 stores tag data (Tag) of 4 cache ways read from the cache tag memory 112 using a tag memory access address (low order digits of the input address) included in the address accessed in each cache way. The comparison part 122 compares the high order digits of the address stored in the buffer 120 and tag data for each cache way stored in the buffer 121 to each other, and determines whether a cache hit or a cache miss is detected. The result of the determination is input to the check and selection part 123. When a cache hit is detected in any one of the cache ways, the check and selection part 123 outputs a data memory request, where the number of the cache way where the cache hit is detected is provided to the data access part 113. When the cache miss is detected with respect to all cache ways, the check and selection part 123 selects the cache way as the target of a refill based on a predetermined rule, and outputs a refill and write back request, including the designation of the number given to the selected cache way, to the refill and write back part 115. When a cache miss is detected with respect to all cache ways, the check and selection part 123 does not select the cache way where a Db flag is "1". When the Db flag is "1", the check and selection part 123 outputs a refill request to the refill and write back part 115. The refill request which is output when the Db flag is "1" is indicated as a debug refill request.

Figure 8:
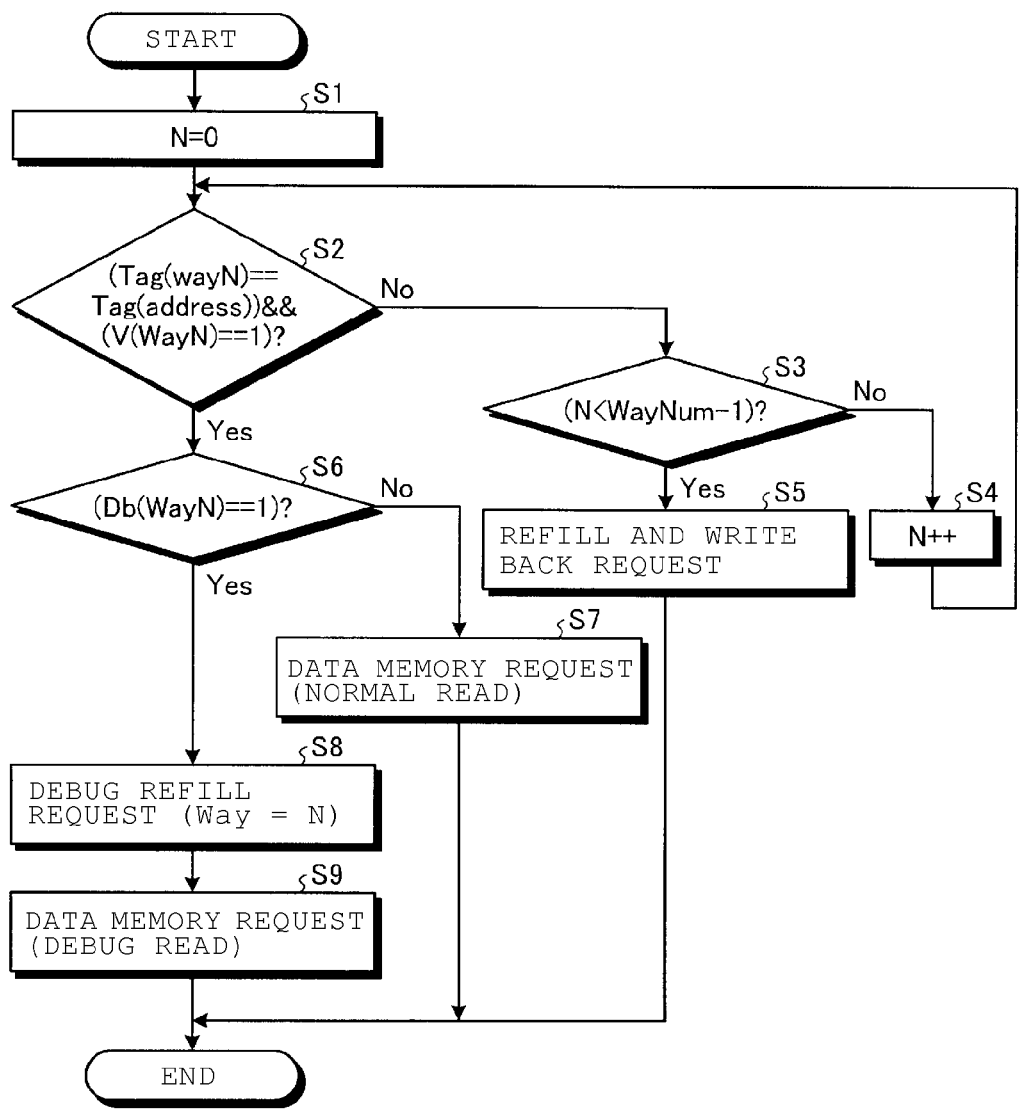
FIG. 8 is a flowchart depicting the operation of a check and selection part according to the first embodiment.

FIG. 8 is a flowchart for explaining the manner of operation of the check and selection part 123 of the first embodiment.

First, the check and selection part 123 initializes a value of a loop index N to "0" (S1). Then, the check and selection part 123 determines whether or not tag data read out from a wayN (i.e., a cache way) matches the high-order digits of an address stored in the buffer 120 and a V flag of the wayN is "1 (valid)" (S2). When the determination in S2 is negative, the check and selection part 123 determines whether or not a value of N is smaller than a value obtained by subtracting 1 from the number of cache ways (S3). When the determination in S3 is negative, the check and selection part 123 increments the value of N by 1 (S4), and executes the determination processing in S2 again. When the determination in S3 is affirmative, the check and selection part 123 outputs a refill and write back request to the refill and write back part 115 (S5), and completes the operation. The refill and write back request includes the designation of the cache way that is the target of a write back and the core number that identifies the core that is the request source.

When the determination in S2 is affirmative, the check and selection part 123 determines whether or not a Db flag of the wayN is "1" (S6). When the Db flag of the wayN is "0" (S6, No), the check and selection part 123 outputs a data memory request for executing a normal read with respect to the corresponding cache line to the data access part 113 (S7), after which the operation is completed. The data memory request includes the designation of the wayN and the core number that identifies the core that is the request source.

When the Db flag of the wayN is "1" (S6, Yes), the check and selection part 123 outputs a debug refill request (for reading out refill data corresponding to the cache line of the wayN from the memory 102) to the refill and write back part 115 (S8). The debug refill request includes the core number that identifies the core that constitutes the request source.

Following the processing in S8, the check and selection part 123 outputs a data memory request (for reading the break indicator string 301 stored in a corresponding cache line in the cache data memory 114) to the data access part 113 (S9), after which the operation is completed.

Hereinafter, the operation for reading the break indicator string 301 may also be expressed as a debug read. The operation for reading a command string 300 from the cache data memory 114 may also be expressed as a normal read. Further, the debug read and the normal read may also be collectively expressed as a data memory read. The data memory request for a normal read and a debug read may have or may not have a difference in format.

When the refill and write back part 115 receives a refill and write back request, the refill and write back part 115 writes write back data read through the data access part 113 to the memory 102. Thereafter, the refill and write back part 115 writes refill data read from the memory 102 to the cache data memory 114 through the data access part 113. When the refill and write back part 115 receives a debug refill request, the refill and write back part 115 transfers refill data read from the memory 102 to the data access part 113. The refill data read in accordance with the debug refill request is used for generating a second command string 303 in the data access part 113, together with the first command string 300 read out from the debug read. In transmitting refill data to the data access part 113, the refill and write back part 115 transmits the core number that identifies the core that constitutes the request source, together with the refill data, to the data access part 113.

Figure 9:
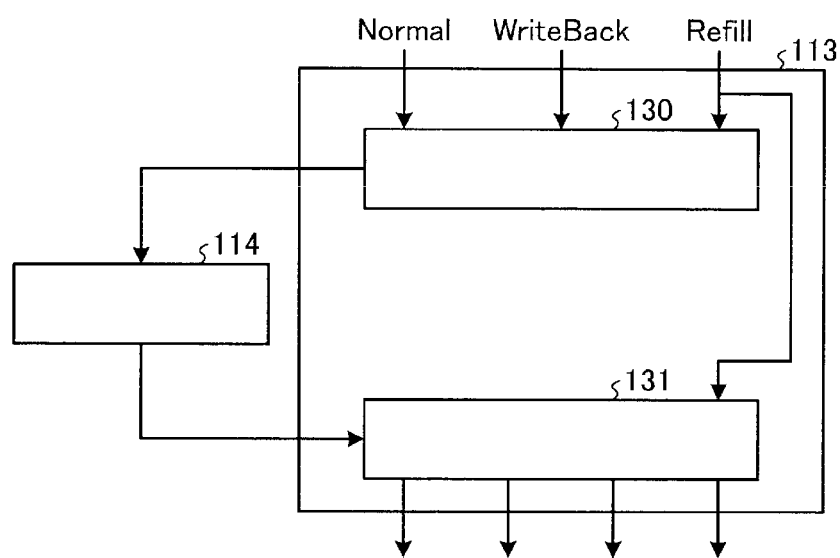
FIG. 9 is a block diagram showing the internal structure of a data access part.

FIG. 9 is a block diagram showing the internal constitution of the data access part 113. The data access part 113 includes an arbiter 130 and a distributor 131.

The arbiter 130 receives a data memory request for performing a normal read and a debug read from the tag read and comparison part 111. The arbiter 130 receives a request for reading out write back data from the refill and write back part 115. The arbiter 130 also receives refill data from the refill and write back part 115. The arbiter 130 arbitrates the received items, selects one of the items, and executes an access corresponding to the selected item with respect to the cache data memory 114. The arbiter 130 writes refill data corresponding to a refill and write back request in the cache data memory 114, but does not write refill data corresponding to the debug refill request in the cache data memory 114. A mechanism where the arbiter 130 determines whether refill data is data corresponding to a refill and write back request or data corresponding to a debug refill request is not limited to a particular mechanism.

The data read from the cache data memory 114 in the data memory read (hereinafter referred to as "read data") is input to the distributor 131. The read data includes the core number, a V flag, and a Db flag in addition to actual data (the first command string 300 and the break indicator string 301 in this embodiment). The refill data which corresponds to the refill and write back request or the debug refill request is also input to the distributor 131.

Figure 10:
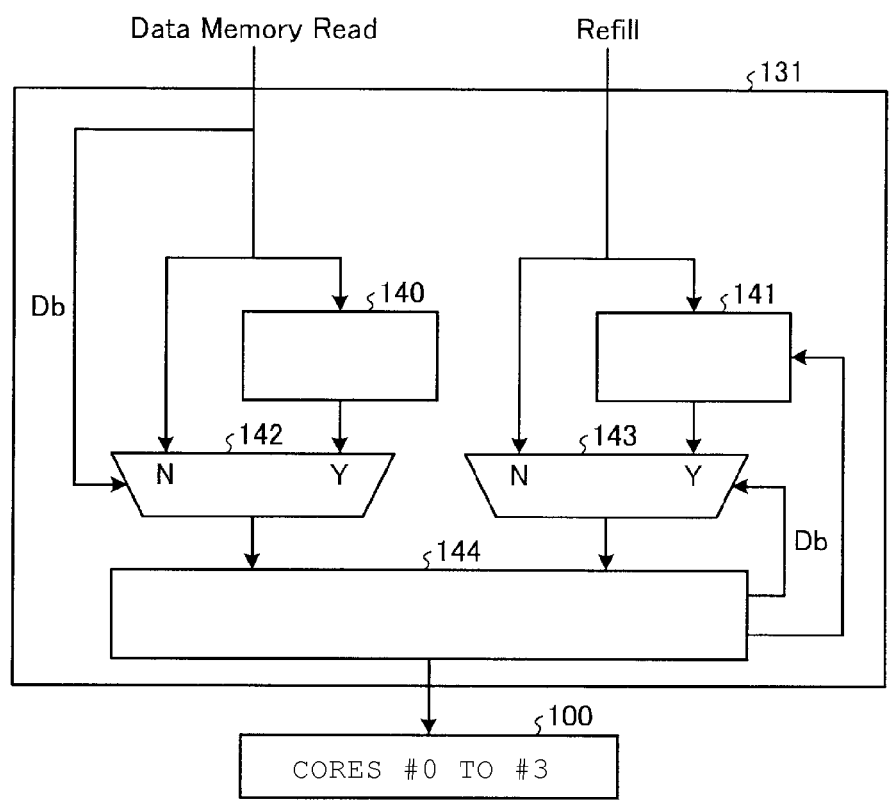
FIG. 10 is a block diagram showing the internal structure of a distributor according to the first embodiment.

FIG. 10 is a block diagram showing the internal constitution of the distributor 131 of the first embodiment. The distributor 131 includes: a mask information generation part 140; a debug command generation part 141; a first selection part 142; a second selection part 143; and a data buffer 144.

The read data is input to the first selection part 142 and the mask information generation part 140. The mask information generation part 140 generates mask information based on the input read data. The mask information generation part 140 inputs the generated mask information to the first selection part 142. A value of a Db flag of the read data is used as a selection signal in the selection part 142. The first selection part 142 selects read data when the Db flag is "0 (N)", and selects mask information when the Db flag is "1 (Y)". The first selection part 142 outputs the selected contents to the data buffer 144.

Figure 11:
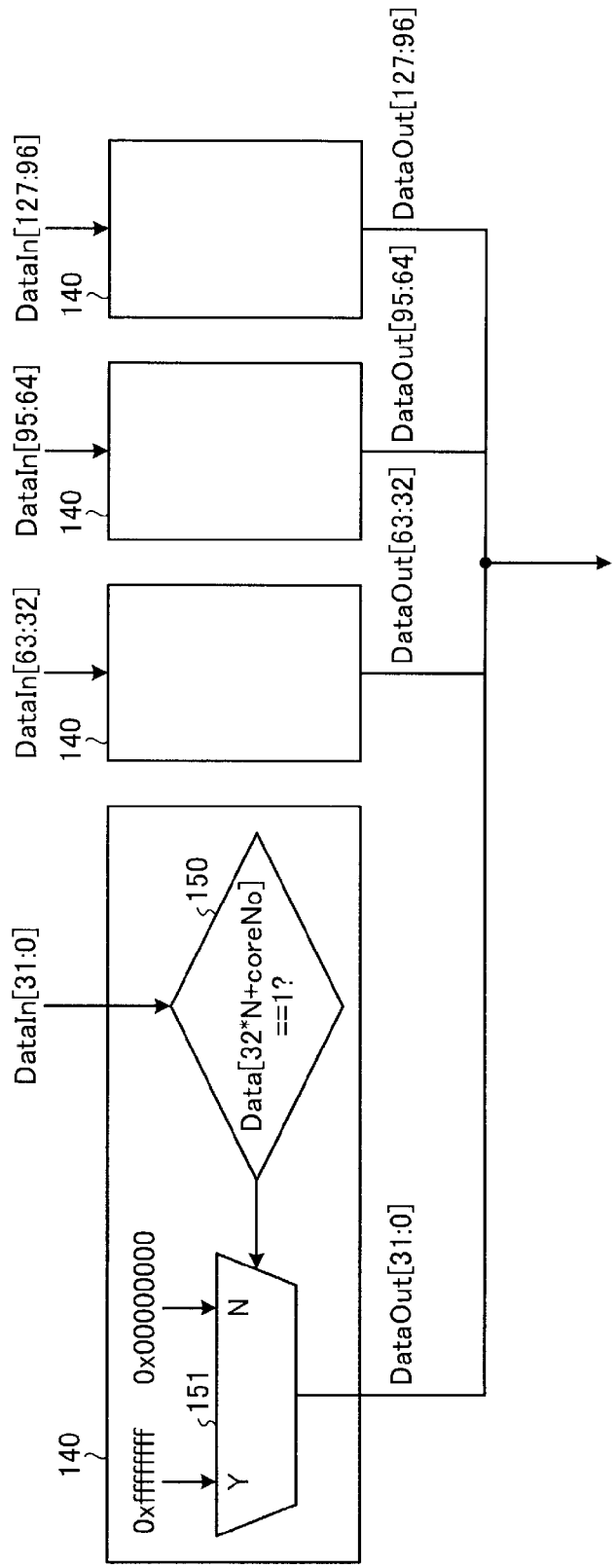
FIG. 11 is a block diagram showing the internal structure of a mask information generation part.

FIG. 11 is a block diagram showing the internal constitution of the mask information generation part 140. An output of the mask information generation part 140 is selected by the first selection part 142 only when the break indicator string 301 is input to the mask information generation part 140. In this embodiment, the explanation is made with respect to the case where the break indicator string 301 is input to each of four mask information generation parts 140. Assume that each mask information generation part 140 applies processing to the break indicator string 301 from (32*N+1)-th bit to 32*(N+1)-th bit of the break indicator string 301. Symbol N is an integer from 0 to 3. That is, data of 1st to 32nd bits, data of 33rd to 64th bits, data of 65th to 95th bits, and data of 96th to 128th bits are processed by one of four mask information generation parts 140 in parallel. Data processed by the respective mask information generation parts 140 are combined with each other in the order corresponding to the original break indicator string 301, and are input to the first selection part 142.

The mask information generation part 140 includes a determination part 150 and a third selection part 151. The determination part 150 determines whether or not each break indicator 302 designates the core that constitutes a request source. In this embodiment, the break indicator 302 has a size of 32 bits and hence, the determination part 150 acquires data of 32 bits from the head of the break indicator string 301 sequentially. Then, the determination part 150 determines whether or not the break indicator 302 designates the core that constitutes a request source based on a bit position in the break that corresponds to the core number.

The result of the determination for each break indicator 302 is used as a selection signal in the third selection part 151. When the break indicator 302 designates the core that constitutes a request source, the third selection part 151 selects "0xffffffff". When the break indicator 302 does not designate the core that is a request source, the third selection part 151 selects "0x00000000" and outputs "0x00000000". For example, when the core which constitutes a request source is core 1, mask information generated from the break indicator string 301 shown in FIG. 5 becomes 0x00000000, 0x00000000, 0xffffffff and 0x00000000. When the core that constitutes a request source is a core other than the core 1, mask information generated from the break indicator string 301 shown in FIG. 5 becomes 0x00000000, 0x00000000, 0x00000000 and 0x00000000.

Figure 12:
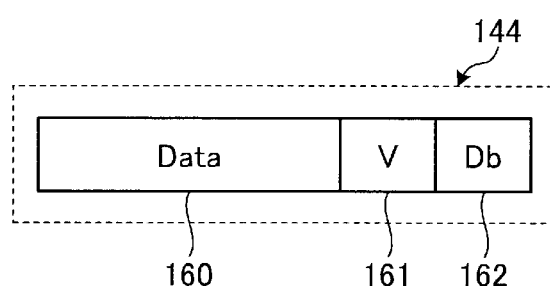
FIG. 12 is a diagram showing the structure of a data buffer.

FIG. 12 is a structural diagram of the data buffer 144. The data buffer 144 includes: a data region 160; a V flag region 161; and a Db flag region 162. The first command string 300 of read data or mask information is stored in the data region 160. The V flag which indicates whether or not a value stored in the data region 160 is valid is stored in the V flag region 161. A value of the Db flag included in the read data is stored in the Db flag region 162. "0 (invalid)" is set to the V flag when the Db flag is "1", and "1 (valid)" is set to the V flag when the Db flag is "0". When the V flag is valid, the core that constitutes a request source reads out data stored in the data region 160. When the V flag is invalid, the core that constitutes a request source does not read out data stored in the region 160.

Refill data is input to the second selection part 143 and the debug command generation part 141. The refill data has the form of the first command string 300. The debug command generation part 141 outputs a command where the command that a break indicator designates as constituting refill data is replaced with a BREAK command. In other words, the debug command generation part 141 either allows the refill data to pass through without change, or generates the second command string 303 using mask information stored in the data buffer 144 and the refill data. An output of the debug command generation part 141 is input to the second selection part 143. The selection part 143 uses a value of a Db flag stored in the data buffer 144 as a selection signal. The selection part 143 selects refill data when the Db flag is "0 (N)", or selects a value input from the debug command generation part 141 (the first command string 300 or the second command string 303) when the Db flag is "1 (Y)". The second selection part 143 outputs the selected contents to the data buffer 144.

Figure 13:
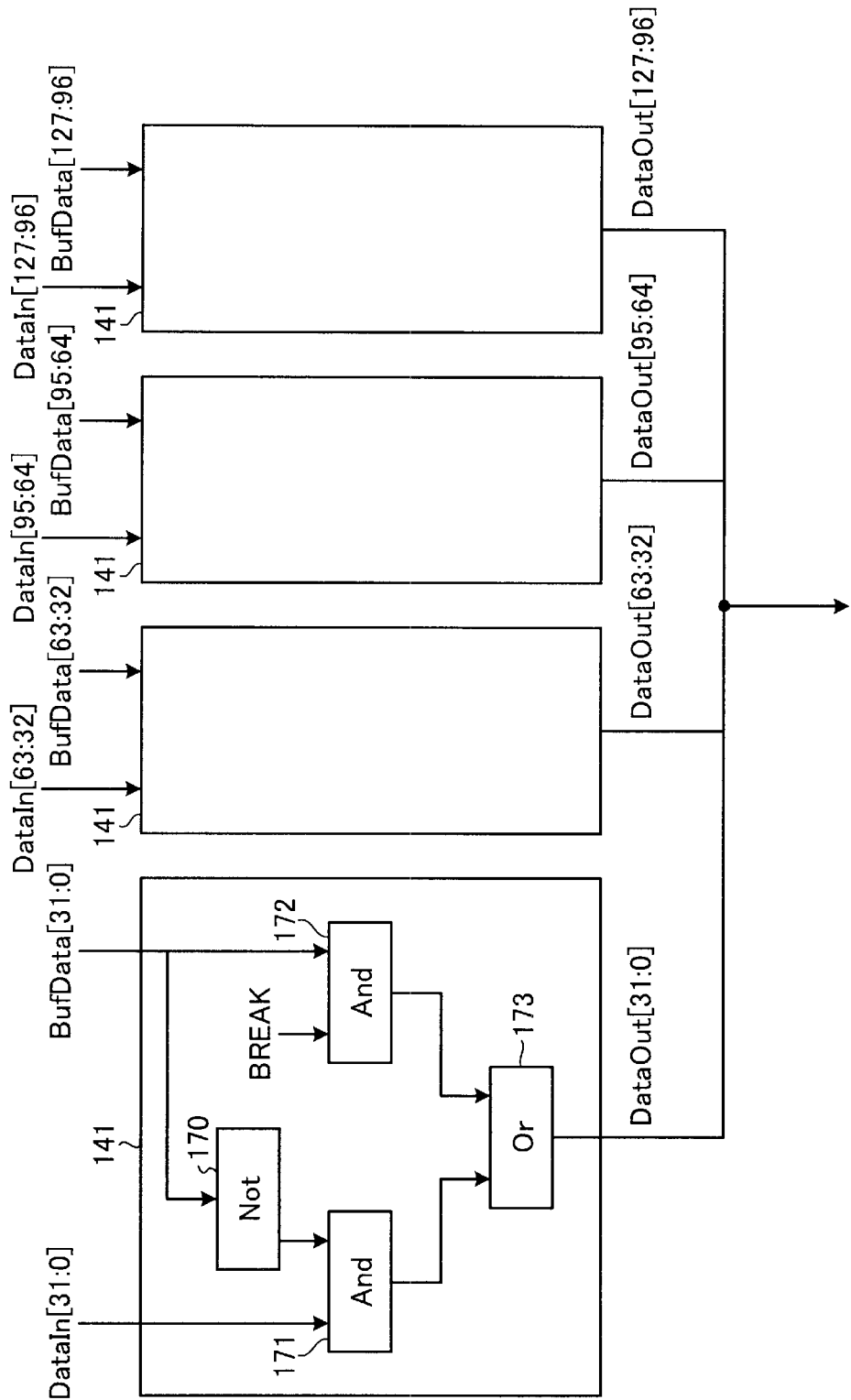
FIG. 13 is a block diagram showing the internal structure of a debug command generation part.

FIG. 13 is a block diagram showing the internal constitution of the debug command generation part 141. An output of the debug command generation part 141 is selected by the second selection part 143 only when the Db flag is "1" (that is, only when mask information is stored in the data region 160). In this embodiment, the explanation assumes that mask information is stored in the data region 160. The distributor 131 includes four debug command generation parts 141. It is assumed that each debug command generation part 141 applies processing to refill data and mask information from (32*N+1)-th bit to 32*(N+1)-th bit. N is the integer selected from 0 to 3. Data that are processed by and output from the respective debug command generation parts 141 are combined with each other in the order corresponding to positions in the original refill data, and are input to the second selection part 143.

The debug command generation part 141 includes: a Not circuit 170; a first And circuit 171; a second And circuit 172; and an Or circuit 173. Mask information from data buffer 144 is input to the Not circuit 170 and the second And circuit 172. The Not circuit 170 outputs the negation of the mask information. The first And circuit 171 outputs a logical product of the refill data and an output of the Not circuit 170. That is, when the mask information is 0xffffffff, the first And circuit 171 outputs 0x00000000. Alternatively, when mask information is 0x00000000, the first And circuit 171 allows a command of the refill data to pass through without change. The second And circuit 172 outputs a logical product of a BREAK command and the mask information. That is, when the mask information is 0xffffffff, the second And circuit 172 outputs the BREAK command. Alternatively, when the mask information is 0x00000000, the second And circuit 172 outputs 0x00000000. The Or circuit 173 outputs a logical sum of an output of the first And circuit 171 and an output of the second And circuit 172. That is, when the mask information includes 0xffffffff, the Or circuit 173 outputs the second command string 303, which is obtained by replacing a command of the first command string 300 that corresponds to the position of the mask value of 0xffffffff in the mask information with a BREAK command. The debug command generation part 141 is constituted as described above and hence, when mask information is 0x00000000, 0x00000000, 0x00000000 or 0x00000000, four debug command generation parts 141 cooperatively allow the first command string 300 to pass through.

The data buffer 144 clears the Db flag for data input from the second selection part 143 to "0", and sets the V flag to "1 (valid)".

Next, the manner of operation of the distributor 131 is explained. Since the Db flag is "0", the read data corresponding to a normal read passes through the first selection part 142, and is stored in the data buffer 144. The Db flag is "0" and, hence, the V flag is set to "1". Since the V flag is set to "1", the core that constitutes a request source may execute the command by reading out the read data.

Since the Db flag is "0", the refill data corresponding to a refill and write back request passes through the second selection part 143 and is stored in the data buffer 144. The Db flag of the refill data is "0" and hence, the Db flag is set to "0" and the V flag is set to "1". Since the V flag is set to "1", the core that constitutes a request source may execute the command by reading out the refill data.

The read data corresponding to a debug read is converted into mask information by the mask information generation part 140, and the mask information is stored in the data buffer 144. A value of the Db flag included in the read data is "1" and hence, V flag is set to "0". Since the V flag is "0", mask information is not read out by the core that constitutes a request source. Thereafter, refill data corresponding to a debug refill request is input to the distributor 131. Refill data and mask information on the data buffer 144 are input to the debug command generation part 141, and either refill data is made to pass by the debug command generation part 141, or the second command string 303 is generated by the debug command generation part 141. The reason read data corresponding to a debug read is input to the distributor 131 earlier than refill data corresponding to a debug refill request is that a refill operation includes an access to the memory 102 which takes more time than does the access to the cache data memory 114. The first command string 300 or the second command string 303 (which is output from the debug command generation part 141) is stored in the data buffer 144. In storing the string in the data buffer 144, the Db flag of the output command string is cleared to "0", and the V flag is set to "1". Hence, the core that constitutes a request source is able to read out and execute either the first command string 300 or the second command string 303.

As has been explained above, when the break indicator 302 is stored in the cache line corresponding to the address to which a read request is made, the distributor 131 determines whether or not the core that constitutes a request source matches the core which the break indicator 302 designates, using the mask information generation part 140. Then, in the debug command generation part 141, when the core that constitutes a request source matches the core which the break indicator 302 designates, the distributor 131 returns a BREAK command to the core which constitutes a request source, while, when these cores do not match each other, the distributor 131 returns a command that is a target of a read request As a result, according to the first embodiment, the information processing apparatus 1 stores the break indicator 302 which includes a Db flag in the cache data memory 114 and, hence, the information processing apparatus 1 determines whether or not a command is replaced with a BREAK command for each core that constitutes a request source, based on an input operation through the debugger 2. That is, a programmer may set a target of a software breakpoint for each core.

According to the first embodiment, the information processing apparatus 1 determines whether or not the command is replaced with a BREAK command corresponding to the core that constitutes a request source and hence, communication between the debugger 2 and the information processing apparatus 1 for each breakpoint is no longer necessary. It is also no longer necessary to stop all cores for each breakpoint.

According to the first embodiment, in the information processing apparatus 1, information on the core which is a target of a breakpoint is not stored in dedicated hardware but is stored in the cache data memory 114. The cache data memory 114 includes a large number of cache lines for increasing a hit ratio and, hence, the number of breakpoints which may be set at one time is large. Further, with respect to the memory in the shared cache 101, in adopting the first embodiment, it is sufficient to apply only the Db flag to the cache tag memory 112 and hence, the increase in required memory in the shared cache 101 is small.

According to the first embodiment, in the debug command generation part 141, the distributor 131 generates a second command string 303 by replacing commands designated by the break indicator 302 in the first command string 300 (which has a plurality of commands) with a BREAK command. The distributor 131 returns the generated second command string 303 to the core that constitutes a request source. As a result, even when the plurality of commands are stored in one cache line, a breakpoint may be set as a predetermined command. In the first embodiment, although the explanation has been made with respect to the case where a plurality of commands are stored in the cache line, data which is stored in the cache line is not limited to commands. A plurality of data of a unit size, other than commands, may be stored in the cache line.

According to the first embodiment, the check and selection part 123 determines whether or not a first command string 300 is to be acquired from the memory 102 based on the Db flag. Based on the result of the determination, the information processing apparatus 1 decides whether or not the first command string 300 is to be acquired from the memory 102 at a point in time when the information processing apparatus 1 references the cache tag memory 112. Accordingly, compared to the case where the first command string 300 is acquired from the memory 102 after referencing the cache data memory 114, an operational speed of the information processing apparatus 1 may be accelerated.

Second Embodiment

In the first embodiment, a command string which is a target of a breakpoint is read out from the memory by a refill operation. On the other hand, in the second embodiment, when a command string which is a target of a breakpoint is cached, a break indicator string which designates the command string as a target of a breakpoint is stored in a cache way that is different from a cache way in which the command string is stored. In such an embodiment, the command string which is a target of a breakpoint may be acquired, not from a system memory, but from a cache data memory and, hence, compared to the first embodiment, it is possible to shorten the time from when a core issues an access request to a time that a BREAK command is returned to the core.

An information processing apparatus of the second embodiment is explained. The information processing apparatus of the second embodiment differs from the information processing apparatus of the first embodiment with respect to a function of a check and selection part and a function of a distributor. In this embodiment, only the check and selection part and the distributor are explained and repeated explanation of the other parts is omitted. Symbols 124 and symbol 132 are given to the check and selection part and the distributor of the second embodiment respectively so as to distinguish these parts from the corresponding parts of the first embodiment.

With respect to cache lines which correspond to the same address in the shared cache 101, the cache lines in which a break indicator string 301 is stored and the cache lines in which a command string 300 is stored may be stored in different cache ways. Accordingly, in setting a breakpoint, when the cache line which corresponds to an address where the command string 300 that is a target of the breakpoint is stored is present in the cache data memory 114, a programmer may store the break indicator string 301 in a cache line in a cache way that is different from the cache line that stores the command string 300. In the tag data corresponding to the address where the command string 300 that is the target of the breakpoint is stored, there exists tag data which corresponds to the cache line where an actual command string 300 is cached, and tag data which corresponds to the cache line where the break indicator string 301 is stored. The programmer sets "1" to a Db flag of tag data corresponding to the cache line where the break indicator string 301 is stored.

Accordingly, there may be a case where the check and selection part 124 detects a cache hit with respect to tag data where the Db flag is "1" and, at the same time, detects a cache hit with respect to tag data where the Db flag is "0". When the check and selection part 124 detects a cache hit with respect to both the tag data where the Db flag is "1" and the tag data where the Db flag is "0", the check and selection part 124 outputs a data memory request twice so as to acquire data (one data being a break indicator string 301, and the other data being a first command string 300 to which a read request is made) from both cache lines.

Figure 14:
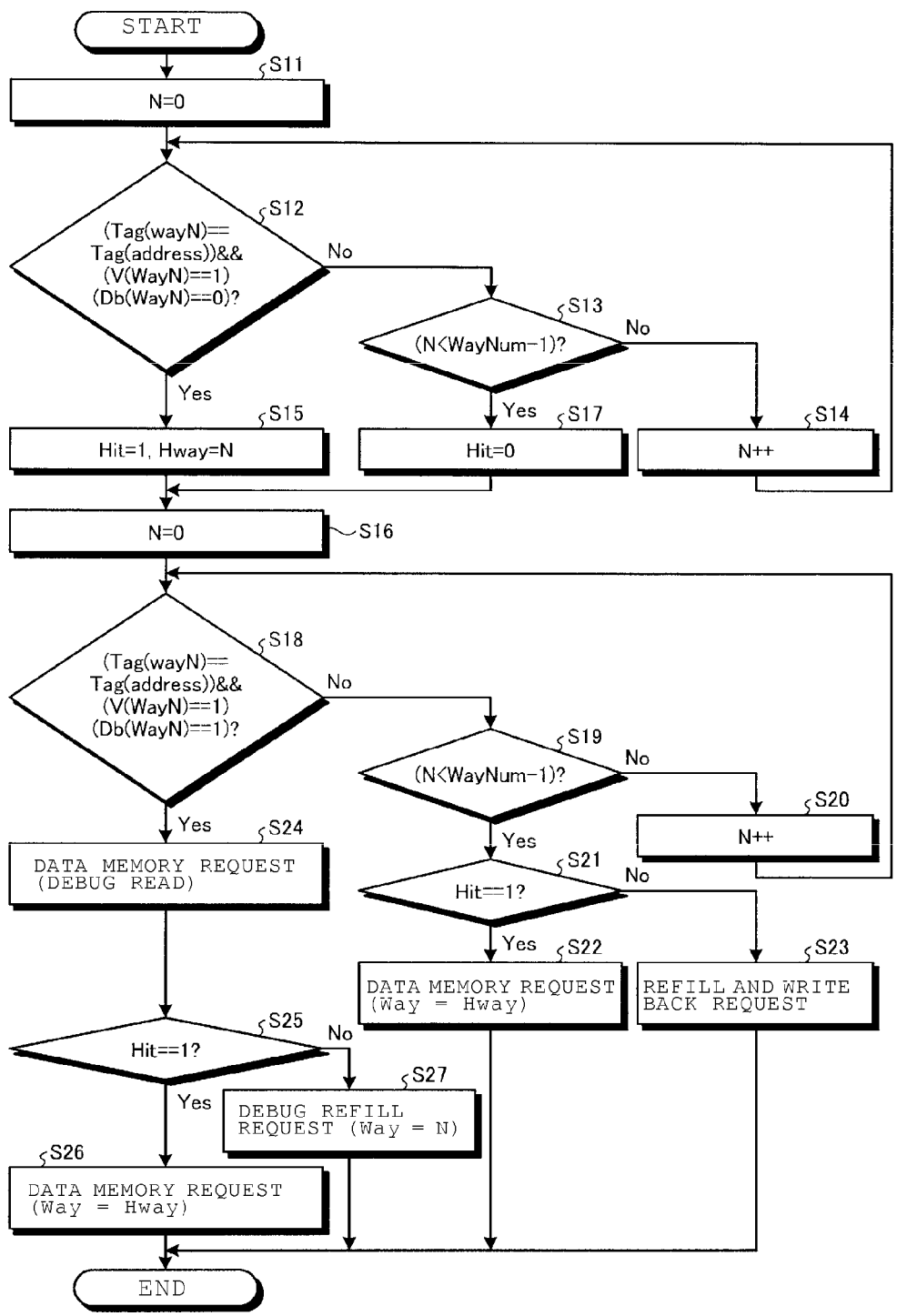
FIG. 14 is a flowchart depicting the operation of a check and selection part according to a second embodiment.

FIG. 14 is a flowchart for explaining the manner of operation of the check and selection part 124 of the second embodiment.

First, the check and selection part 124 initializes a value of a loop index N to "0" (S11). Then, the check and selection part 124 determines whether or not tag data read out from a wayN matches high-order digits of an address stored in the buffer 120, a V flag of the wayN is "1 (valid)" and a Db flag of the wayN is "0" (S12). When the determination in S12 is negative, the check and selection part 124 determines whether or not the value of N is smaller than a value obtained by subtracting 1 from the number of cache ways (S13). When the determination in S13 is negative, the check and selection part 124 increments the value of N by 1 (S14), and executes determination processing in S12 again.

When the determination in S12 is affirmative, the check and selection part 124 sets the variable Hit to "1", and sets the value of the loop index N at that point of time to the variable Hway (S15). Then, the check and selection part 124 initializes the value of the loop index N to "0" (S16). When the determination in S13 is affirmative, the check and selection part 124 sets "0" to the variable Hit (S17), and executes processing in S16.

After processing in S16, the check and selection part 124 determines whether or not tag data read out from the wayN matches the high-order digits of the address stored in the buffer 120, the V flag of the wayN is "1 (valid)," and the Db flag of the wayN is "1" (S18). When the determination in S18 is negative, the check and selection part 124 determines whether or not the value of N is smaller than a value obtained by subtracting 1 from the number of cache ways (S19).

When the determination in S19 is negative, the check and selection part 124 increments the value of N by 1 (S20) and executes the determination in S18 again. On the other hand, when the determination in S19 is affirmative, the check and selection part 124 determines whether or not the variable Hit is "1" (S21). When the variable Hit is "1" (S21, Yes), the check and selection part 124 outputs a data memory request that designates the cache way by having the number of the cache way set in the variable Hway (S22), and the operation is completed. When the variable Hit is "0" (S21, No), the check and selection part 124 outputs a refill and write back request (S23), and the operation is completed.

When the determination in S18 is affirmative, the check and selection part 124 outputs a data memory request for a debug read which reads out a break indicator string 301 stored in a corresponding cache line in the cache data memory 114 (S24). Then, the check and selection part 124 determines whether or not the variable Hit is "1" (S25). When the variable Hit is "1" (S25, Yes), the check and selection part 124 outputs a data memory request and designates the cache way by having the number of the cache way set in the variable Hway in order to acquire a first command string 300 from the cache data memory 114 (S26), and the operation is completed. When the variable Hit is "0" (S25, No), in order to acquire the first command string 300 from the memory 102 in the same manner as the first embodiment, the check and selection part 124 outputs a debug refill request where a wayN is designated (S27), and the operation is completed.

Figure 15:
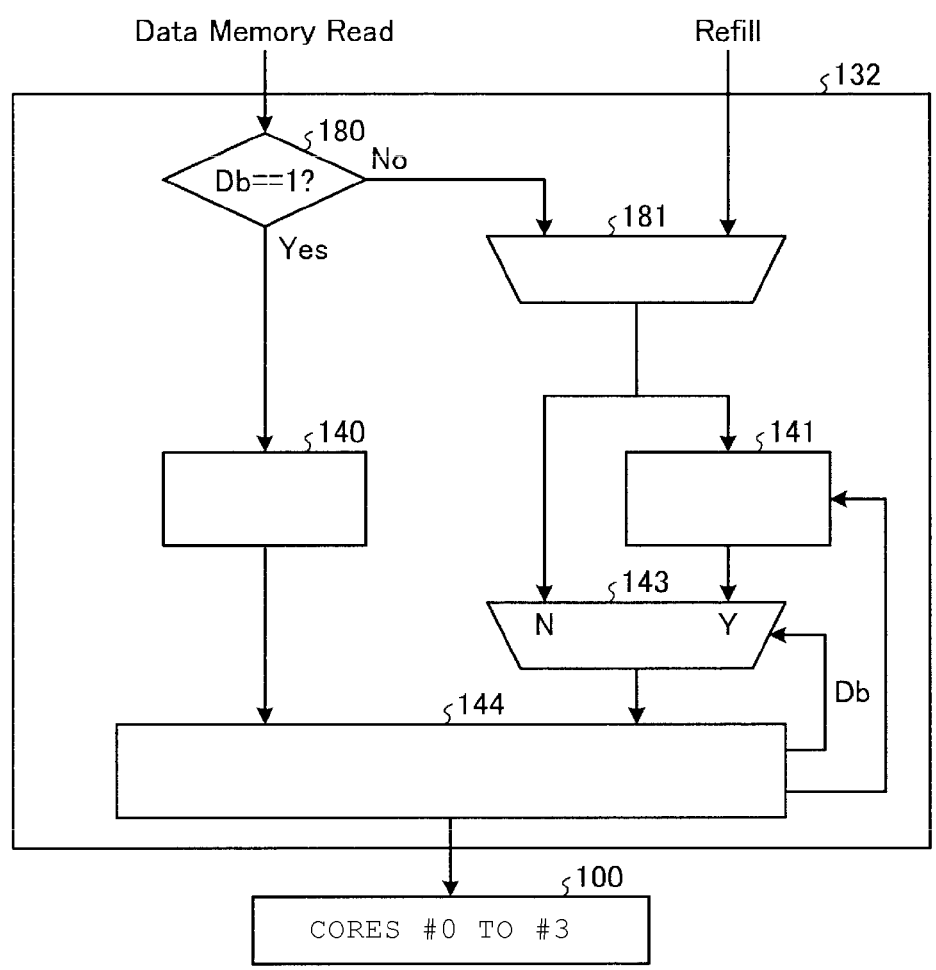
FIG. 15 is a block diagram showing the internal structure of a distributor according to the second embodiment.

FIG. 15 is a block diagram showing the internal constitution of the distributor 132 of the second embodiment. The distributor 132 includes: a branch part 180; a first selection part 181; a mask information generation part 140; a debug command generation part 141; a second selection part 143; and a data buffer 144.

Read data is input to the branch part 180. The branch part 180 determines whether or not a Db flag included in the read data is "1 (Y)". When the Db flag is "1 (Y)", the branch part 180 inputs the read data to the mask information generation part 140. The mask information generation part 140 outputs mask information generated based on the input read data to the data buffer 144.

When the Db flag is "0 (N)", that is, when the read data is the first command string 300, the branch part 180 inputs the read data to the selection part 181. Further, refill data, that is, the first command string 300 read out from the memory 102 is input to the selection part 181. The selection part 181 selects data which is input last out of two input data. The selected data is input to the selection part 143 and the debug command generation part 141. The debug command generation part 141 either allows input data to pass through without change, or generates a second command string 303 using mask information in the data buffer 144 and input data. An output of the debug command generation part 141 is input to the second selection part 143. The second selection part 143 stores data which is selected based on a value of the Db flag stored in the data buffer 144 in the data buffer 144.

The manner of operation of the distributor 132 is explained. A Db flag is "0" and hence, read data corresponding to a normal read is input to the first selection part 181 through the branch part 180. There is no inputting of refill data and hence, the first selection part 181 outputs read data. The Db flag is "0" and, hence, the read data is selected by the second selection part 143. The V flag is set to "1", and the read data is stored in the data buffer 144. Because the V flag is set to "1", the core that constitutes a request source may read out the read data from the data buffer 144 and execute the command.

The read data corresponding to a debug read is converted into mask information by the mask information generation part 140 and is stored in the data buffer 144. The Db flag is "1" and hence, the V flag is set to "0". Because the V flag is "0", the mask information stored in the data buffer 144 is not read out by the core that constitutes a request source.

Thereafter, the first command string 300 (either refill data corresponding to the debug refill request or read data corresponding to a data memory request with respect to a cache way that is different from the cache way where the break indicator string 301 is stored) is input to the distributor 132.

When refill data corresponding to a debug refill request is input, the refill data is selected by the first selection part 181. When read data corresponding to the data memory request with respect to the cache way that is different from the cache way where the break indicator string 301 is stored is input, the read data is selected by the first selection part 181. Then, data input to the debug command generation part 141 is either allowed to pass through without change, or is converted into the second command string 303. The first command string 300 or the second command string 303 which is output from the debug command generation part 141 is stored in the data buffer 144. In storing the string, the Db flag is cleared to "0", and the V flag is set to "1" and, hence, the first command string 300 or the second command string 303 where the core that constitutes a request source is stored may be read out and may be executed.

There is no inputting of read data corresponding to a data memory read and hence, refill data corresponding to a refill and write back request is selected by the first selection part 181. A Db flag is "0" and hence, the refill data is stored in the data buffer 144. The Db flag is "0" and hence, "1" is set to a V flag of the data buffer 144. Since "1" is set to the V flag, the core that constitutes a request source may read out the refill data and may execute the command.

According to the second embodiment, it is possible to acquire the command string which is a target of a breakpoint from the cache data memory. Accordingly, compared to the first embodiment, the second embodiment may shorten the time from when the core issues an access request to when a BREAK command is returned to the core. Further, according to the second embodiment, when the core which constitutes a request source is not designated by the break indicator 302, the first command string 300 to which a read request is made is read out from the cache data memory 114. Accordingly, when the core which is not a target of a breakpoint is a request source, processing for returning the first command string 300 to the core which constitutes a request source may be performed at a higher speed compared to the first embodiment.

According to the first and second embodiments, the shared cache 101 may set the break indicator 302 for designating the core, and the shared cache 101 changes over whether or not a BREAK command is returned based on the comparison between the core to which a read request is made and the core which the break indicator 302 designates and hence, a target of a software breakpoint may be set for each core.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a system memory;
   a cache system including a cache memory; and
   a plurality of cores, each of which accesses the system memory and the cache memory, wherein
   the cache system stores in a cache line of the cache memory a break indicator that designates one or more of the plurality of cores, and is configured to:
   determine whether a first core in the plurality of cores that issues a request to read data from an address that corresponds to the cache line in which the break indicator is stored, matches one of the cores designated by the break indicator; and
   responsive to the determining, return a break command to the first core if the first core matches one of the cores designated by the break indicator, and return the data to the first core if the first core does not match one of the cores designated by the break indicator.

2. The information processing apparatus of claim 1, wherein
   the data is a command string comprising a plurality of commands, and
   the break indicator comprises a plurality of data units, at least one of which designates one of the cores.

3. The information processing apparatus of claim 2, wherein the cache system is further configured to replace one of the commands in the command string with a break command if the first core matches one of the cores designated by the break indicator.

4. The information processing apparatus of claim 3, wherein the cache memory comprises a cache data memory and a cache tag memory, the cache data memory storing the break indicator at a location corresponding to the address and the cache tag memory storing a debug flag at a location corresponding to the address.

5. The information processing apparatus of claim 4, wherein the cache system is further configured to:
   determine that the debug flag is set at the location in the cache tag memory corresponding to the address; and
   responsive to said determining, read the break indicator from the cache data memory at the location corresponding to the address and read the command string from the system memory.

6. The information processing apparatus of claim 5, wherein the cache system includes a mask generator that is configured to generate a mask based on the break indicator, wherein the mask indicates which of the commands in the command string is to be replaced by a break command.

7. The information processing apparatus of claim 6, wherein the cache system includes a command generator that is configured to:
   read the command string;
   read the mask; and
   replace one of the commands in the command string with a break command based on the mask.

8. The information processing apparatus of claim 4, wherein the cache system comprises a plurality of cache ways, and is further configured to:
   determine that the debug flag is set for the address;
   responsive to said determining, read the break indicator from a cache line of a first cache way at a location corresponding to the address and read the command string from a cache line of a second cache way at a location corresponding to the address.

9. A method of debugging in a computer system comprising a system memory, a cache system that includes a cache memory, and a plurality of cores that access the system and cache memory, the method comprising:
   storing a break indicator in a cache line of the cache memory, the break indicator designating one or more of the plurality of cores;
   receiving from a first core in the plurality of cores a request to read data from an address that corresponds to the cache line in which the break indicator is stored;
   determining whether the first core matches one of the cores designated by the break indicator; and
   responsive to the determining, returning a break command to the first core if the first core matches one of the cores designated by the break indicator, and returning the data to the first core if the first core does not match one of the cores designated by the break indicator.

10. The method of claim 9, wherein
    the data is a command string comprising a plurality of commands, and
    the break indicator comprises a plurality of data units, at least one of which designates one of the cores.

11. The method of claim 10, further comprising, responsive to determining that the first core matches one of the cores designated by the break indicator, replacing one of the commands in the command string with a break command based on a data unit in the break indicator that corresponds to the command.

12. The method of claim 11, wherein the cache memory comprises a cache data memory and a cache tag memory, the cache data memory storing the break indicator in a location corresponding to the address and the cache tag memory storing a debug flag in a location corresponding to the address.

13. The method of claim 12, further comprising:
    determining that the debug flag is set at the location in the cache tag memory corresponding to the address;
    responsive to said determining, reading the break indicator from the cache data memory at the location corresponding to the address and reading the command string from the system memory.

14. The method of claim 13, further comprising:
    generating a mask based on the break indicator, wherein the mask indicates which of the commands in the command string is to be replaced by a break command; and
    replacing one of the commands in the command string with a break command based on the mask.

15. The method of claim 12, wherein the cache system comprises a plurality of cache ways, the method further comprising:
    determining that the debug flag is set at the location in the cache tag memory corresponding to the address; and
    responsive to said determining, reading the break indicator from a cache line of a first cache way at a location corresponding to the address and reading the command string from a cache line of a second cache way at a location corresponding to the address.

16. A computer system comprising:
a system memory;
a cache memory; and
a plurality of cores, each of which accesses the system memory that stores a command string including a plurality of commands to be read by one of the plurality of cores, and a cache memory that stores a debug string that designates one or more of the cores as a debugging target, wherein the command string is stored at an address in system memory and the debug string is stored in a cache line of the cache memory that corresponds to the address; and
a selection unit configured to determine that a core that issues a read to the address in system memory that stores the command string matches one of the cores designated by the debug string.

17. The system of claim 16, further comprising a mask generation unit configured to generate a mask based on the debug string, the mask indicating which of the commands in the command string is to be replaced by a break command.

18. The system of claim 17, further comprising a command generation unit configured to generate a second command string based on the mask and the first command string, wherein the second command string is generated by replacing one of the commands in the command string with a break command.

* * * * *